United States Patent Office 3,208,332
Patented Sept. 28, 1965

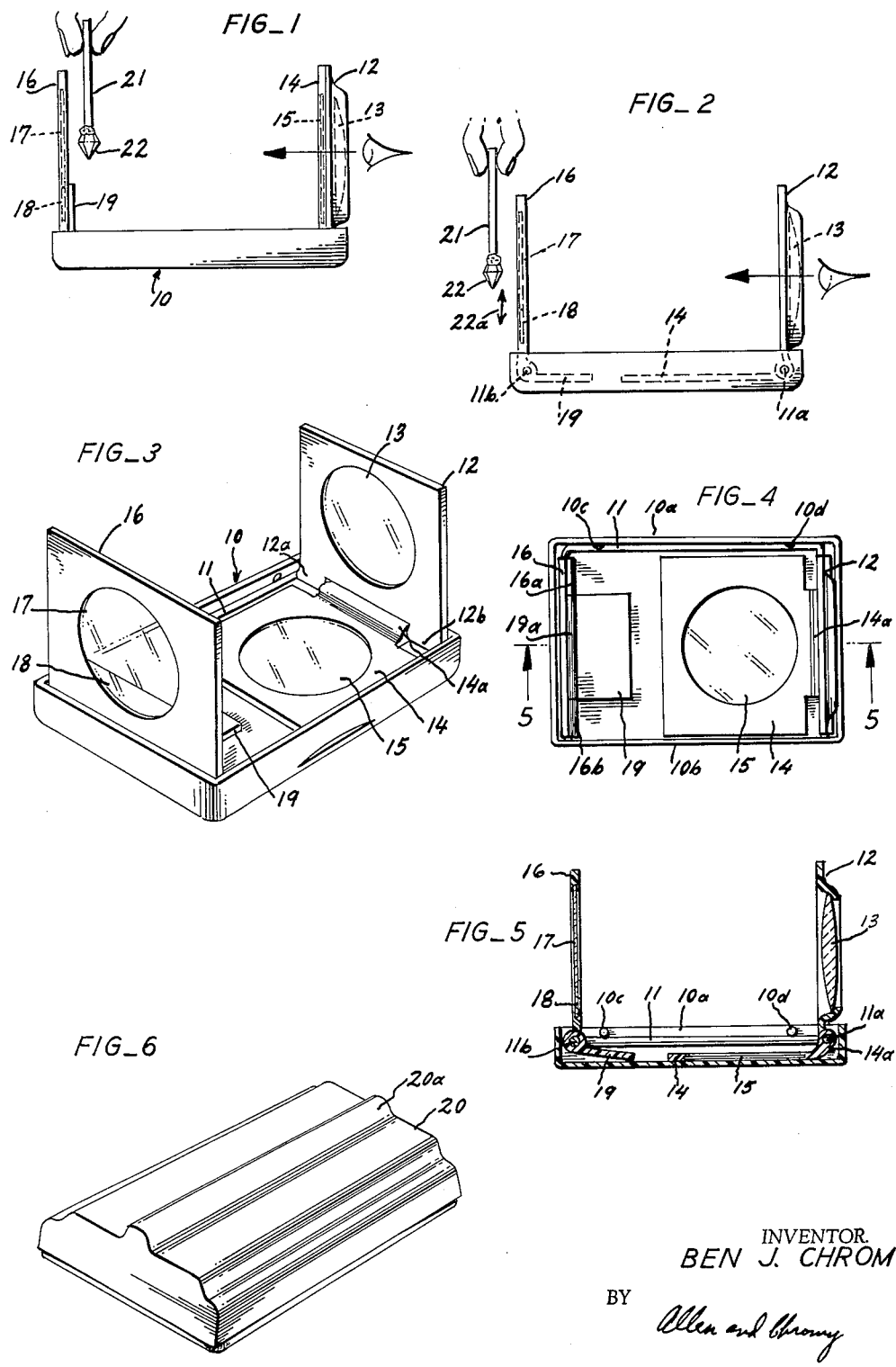

3,208,332
DEVICE FOR OPTICAL EXAMINATION OF GEM MATERIALS WITH POLARIZED LIGHT
Benjamin J. Chromy, 14590 Horseshoe Drive, Saratoga, Calif.
Filed Mar. 5, 1963, Ser. No. 263,035
3 Claims. (Cl. 88—14)

This invention relates to a device for examining transparent or translucent minerals, gems, and gem materials.

An object of this invention is to provide an improved device for the optical examination of transparent or translucent crystalline minerals or gem materials to determine the crystalline or amorphous nature thereof.

Another object of this invention is to provide an improved device of compact construction that may be employed either as a polariscope or as a dichroscope.

Still another object of this invention is to provide an improved optical device for examining gem or crystalline materials, said device being constructed so that it may be folded and easily carried in a person's pocket.

Still a further object of this invention is to provide a foldable device for examining gem or crystalline materials, said device being provided with a plurality of pieces of light polarizing material which are pivotally supported so that they may be selectively erected into the optical path of the device and the device may be used either as a polariscope or as a dichroscope, at least one of the pieces of light polarizing material being used in both the polariscope and the dichroscope.

Other and further objects of this invention will be apparent to those skilled in the art to which it relates from the following specification, claims and drawing.

In accordance with this invention, there is provided an improved device for examining certain gem materials. This device is adapted to be folded into a compact unit such that it is easily carried in a person's pocket.

This device is an improvement over my prior Patents No. 2,934,993 and No. 2,986,064 in that it makes more efficient use of the light polarizing elements provided thereto. The present device also is constructed so that a more compact unit is produced which is easier to manufacture.

This device is provided with three polarizing elements, two of which are shaped to form sections of a circular disc and one of these sections is substantially larger than the other. These sections arranged in the same plane with their light polarizing directions at right angles to each other and these two light polarizing elements are used when the device is employed as a dichroscope. The third light polarizing element is positioned adjacent to the eyepiece spaced from the other two and its light polarizing direction is oriented so that it is at right angles to that of the larger of the first two polarizing elements. These are used when the device is employed as a polariscope. All of the light polarizing elements plus the eyepiece are pivotally supported so that they may be folded into a tray-like container or receptacle which is provided with a cover fitting thereover. The inside of the cover is provided with a long groove or recess for receiving the dop stick that is to be employed for holding the gem material during examination thereof in the device.

Referring to the drawing briefly:

FIG. 1 is a side view of an embodiment of this device arranged for use as a polariscope;

FIG. 2 is a side view of an embodiment of this device arranged to be used as a dichroscope;

FIG. 3 is a perspective view of this device arranged for use as a dichroscope;

FIG. 4 is a top view of the device showing the elements thereof arranged when the device is used as a dichroscope;

FIG. 5 is a sectional view taken along the line 5—5; and

FIG. 6 is a perspective view of the cover as applied to the bottom tray when all of the optical elements thereof are folded into the tray.

Referring to the drawing in detail there is shown in FIG. 1 a side view of this device being used as a polariscope. This device is provided with a tray 10 which is made of suitable plastic material that may be formed by the vacuum molding process and which functions as a receptacle for the various optical elements thereof. Inside of this tray 10 there is positioned a substantially U-shaped wire member 11 which is provided with substantially parallel arms 11a and 11b. Arm 11a functions as the pivoting means for the eyepiece 12 and the panel 14 and arm 11b function as the pivoting means for panels 16 and 19. Thus the eyepiece 12 and panels 14, 16 and 19 are adapted to be folded into the tray 10.

The tray 10 is provided with side walls 10a and 10b. Side wall 10a is formed with dimples 10c and 10d that project inwardly and engage the wire member 11 to prevent it from being accidentally dislodged from the tray. The eyepiece 12 is provided for supporting the lens 13 that is held by friction in a suitable cavity in the panel forming the eyepiece. This lens has a focal length such that the gem 22 supported on the dop stick 21 may be viewed on either side of the panel 16, as shown in FIGS. 1 and 2, and still provide a good image to the observer.

The eyepiece panel 12 is provided with portions 12a and 12b which encircle parts of the pivoting wire arm 11b and thus provide for pivotally supporting this eyepiece panel in the tray 10. The panel 14 is formed with an aperture therein for receiving the light polarizing member 15 which is cemented in this aperture. This panel is also provided with a portion 14a which encircles the pivoting wire 11b and which is positioned between the parts 12a and 12b of the eyepiece panel. Thus the panel 14 may be erected so that it is positioned against the eyepiece panel as shown in FIG. 1, when this device is to be used as a polariscope.

The other arm 11a of the wire member 11 cooperates with panels 16 and 19 for the pivotal support thereof. Panel 16 is provided with two polarizing elements 17 and 18 which are arranged with the light polarizing planes thereof at right angles to each other, and the larger element 17 is arranged so that the light polarizing plane thereof is at right angles to the light polarizing plane of the element 15 supported in the panel 14. Panel 16 is formed with two parts 16a and 16b thereof in the shape of sleeves that are adapted to receive the pivoting arm 11a for pivotally supporting this panel thereof.

The mask 19 is provided with a sleeve 19a which is positioned on the pivoting arm 11a between the sleeves 16a and 16b of panel 16 so that this mask is also pivoted on the arm 11a. When the mask is erected as shown in FIG. 1, it covers the lower right polarizing element 18 so that this element cannot be seen when the observer is looking through the eyepiece. Thus when the panels 14, 16 and mask panel 19 are all erected as shown in FIG. 1, the device is arranged to be used as a polariscope. Since the plane of polarization of element 18 is parallel to that of element 15 the mask 19 functions to mask out the light coming through element 18 so that this light does not interfere with the examination of the gem 22 when this gem is being examined in the polariscope. The gem 22, which is supported on the dop stick 21 by material such as beeswax, is held adjacent to the light polarizing element 17 when it is to be examined to determine whether or not it is doubly refractive. Either the gem 22 may be rotated at right angles to the axis of the device or the device itself may be rotated on this axis during the examination of the gem 22 in the polariscope. The gem is rotated and tilted slowly between the light polarizing elements while it is being observed through the eyepiece and while the device is pointed toward a source of light, so that the gem may be examined along different directions which may correspond to the different crystallographic axes thereof if the gem is in fact made of doubly refractive gem material. Care must of course be exercised so that the observer is not misled by so-called anomalous double refraction introduced into the gems made of material such as, glass, by stresses and strains. However, this will not mislead the careful observer because the optical patterns of effects produced therby are different from those encountered in doubly refractive crystallized materials.

This instrument may therefore be used to separate gems into two groups, that is, those that are not doubly refractive including (1) those that are amorphous, namely glass, and those crystallizing in the isometric system, such as, diamond, spinel, garnet, etc., and (2) those that are doubly refractive which includes those crystallizing in the hexagonal system (quartz, tourmaline, apatite, beryl, etc.) the tetragonal system (zircon, idocrase, etc.) the orthorhombic system (topaz, danburite, andalusite, etc.) the monoclinic system (epidote, orthoclase feldspars, etc.) and the triclinic system (kyanite, axinite, plagioclase feldspars, etc.)

When the device is to be employed as a dichroscope, the panel 14 and the mask panel 19 are folded down into the receptacle or tray as shown in FIG. 2, and the gem is held on the outside of the panel 16. During the examination of the gem in the dichroscope the gem is slowly rotated with respect to the axis of the dichroscope and it is also gradually moved in the direction indicated by the arrow 22a.

Colored gems made of transparent or translucent minerals crystallizing in the five systems listed under group 2 all show pleochroism to a certain extent when examined in directions other than along their optic axes although this effect is quite weak in some varieties. It is therefore necessary to examine the gem or stone very carefully in different directions both by rotating it slowly in front of the junction between the elements 17 and 18 and by moving it slowly across this junction. This latter movement should be effected at the same time as the rotative movement.

In using this device as a dichroscope the device should not be pointed directly into a source of bright light but rather it should be pointed toward light such as that coming from a north window or diffuse light reflected from a rough white surface. Otherwise it is difficult to observe weak dichroic effects such as are observed for example from some varieties of amethyst, rose quartz, emerald, etc. Of course, where the dichroic effect is distinct as for example in the case of andalusite and tourmaline these precautions may not be as important as in the case of weakly dichroic materials.

This device is provided with a cover 20, as shown in FIG. 6, and this cover is formed with a groove or recess 20a into which the dop stick 21 may be placed for storage thereof.

While I have shown a preferred embodiment of the invention it will be understood that the invention is capable of variations and modification from the form shown so that its scope should be limited only by the scope of the claims appended hereto.

What I claim is:

1. A foldable device for use in the examination of transparent or translucent gem materials with polarized light, said device being adapted to be held up to an eye of the observer so that the gem material may be manipulated in the device and inspected in polarized light, the combination comprising a tray, a pair of light polarizing elements, a third light polarizing element, an eyepiece and a mask for one of said pair of light polarizing elements, means pivotally supporting said pair of light polarizing elements together adjacent to each other in one end portion of said tray, means pivotally supporting said mask adjacent to said one of said pair of polarizing elements, means pivotally supporting said eyepiece and said third light polarizing element in the other end portion of said tray, said eyepiece, said light polarizing elements and said mask being foldable into or out of said tray, the other of said pair of light polarizing elements and said third light polarizing element being supported with the light polarizing planes thereof crossed when these elements are folded out of said tray so that gem materials supported and rotated therebetween may be examined to determine whether they are singly or doubly refractive when said device is pointed in the direction of a light source and held with said eyepiece up to an eye of the observer, said mask being adapted to render said one of said pair of light polarizing elements ineffective when said mask is folded out of said tray and the device is used as a polariscope, said pair of light polarizing elements having the light polarizing planes thereof at right angles to each other so that the device is arranged to function as a dichroscope when these elements are folded out and said mask and said third light polarizing element are folded into said tray.

2. In a device for examining gems and similar crystalline materials to observe if they are doubly refractive and dichroic, the combination of a tray having side walls, a plurality of panels, means pivotally supporting said panels in said tray so that said panels may be folded into said tray when not in use, a first one of said panels having means supporting a lens, said one of said panels being pivotally supported by said supporting means in one end of said tray, a second one of said panels being pivotally supported by said supporting means adjacent to said first one of said panels, a first light polarizing element attached to said second panel, a mask and a third one of said panels being pivotally supported by said supporting means in the other end of said tray, a pair of light polarizing elements supported by said third panel, said pair of light polarizing elements having the light polarizing planes thereof oriented at right angles to each other, said mask being adapted to mask one of said pair of light polarizing elements to render said one of said pair of light polarizing elements ineffective when said mask is folded out of said tray, the light polarizing plane of the other one of said pair of elements being oriented at right angles to the light polarizing plane of said first light polarizing element whereby when these light polarizing elements and said first panel and said lense are erected and said mask is erected to mask said one of said pair of elements the device is arranged to function as a polariscope, the device being arranged to function as a dichroscope when said first light polarizing element and said mask are folded into said tray and said first panel and lens and said third panel supporting said pair of light polarizing elements are erected.

3. A foldable device for use in the examination of transparent or translucent gem materials with polarized light, said device being adapted to be held up to an eye of the observer so that the gem material may be manipulated in the device and inspected in polarized light, the combination comprising a tray, an eyepiece, a pair of light polarizing elements, a third light polarizing element and a mask, a substantially U-shaped wire member positioned in said tray with the arms thereof in the end portions of said tray, means pivotally supporting said eyepiece and said third light polarizing element on one of said arms and means pivotally supporting said pair of light polarizing elements and said mask on the other of said arms so that said eyepiece, said polarizing elements and said mask are foldable into or out of said tray, one of said pair of light polarizing elements and said third light polarizing element being supported with the light polarizing planes thereof crossed when these elements are folded out of said tray so that gem materials supported and rotated therebetween may be examined to determine whether they are singly or doubly refractive when said device is pointed in the direction of a light source and held wtih said eyepiece up to an eye of the observer and when said mask is folded out of said tray to render the other of said pair of light polarizing elements ineffective the device is arranged to function as a polariscope, said pair of light polarizing elements having the light polarizing planes thereof at right angles to each other so that the device is arranged to function as a dichroscope when these elements and said eyepiece are folded out of said tray and said mask and said third light polarizing element are folded into said tray.

References Cited by the Examiner

UNITED STATES PATENTS

| | | | |
|---|---|---|---|
| 2,157,437 | 5/39 | Shipley | 88—14 |
| 2,986,064 | 5/61 | Chromy | 88—14 |

JEWELL H. PEDERSEN, *Primary Examiner.*